3,901,464

United States Patent [19]
Arnstein et al.

[11] 3,901,464
[45] Aug. 26, 1975

[54] FLIGHT CONTROL DEVICE

[75] Inventors: Bennett R. Arnstein, Los Angeles, Calif.; Jacob C. Cobin, deceased, late of Los Angeles, Calif., by Evelyn Cobin, administratrix, Los Angeles, Calif.

[73] Assignee: The United States of America as represented by the Secretary of the Air Force, Washington, D.C.

[22] Filed: Nov. 8, 1974

[21] Appl. No.: 522,366

[52] U.S. Cl. .................... 244/46; 74/469; 244/75 R; 244/83 R
[51] Int. Cl.² .......................................... B64C 13/30
[58] Field of Search ............ 244/46, 42 D, 43, 75 R, 244/83 R; 74/469, 501 R, 506; 254/175.3

[56] References Cited
UNITED STATES PATENTS
2,773,659  12/1956  Feeney ........................ 244/83 R X
3,142,459  7/1964  Baetke ........................ 244/46 X Primary Examiner—Trygve M. Blix
Assistant Examiner—Barry L. Kelmachter
Attorney, Agent, or Firm—Arsen Tashjian; Joseph E. Rusz

[57] ABSTRACT

A flight control device, adapted for use with an airborne vehicle having variable sweep wings, to control a spoiler on the trailing edge of the upper surface of each wing. The inventive device includes: an element for transmitting the motion and the power imparted by the pilot, or other user; a drive mechanism connected to the transmitting element; and, another motion and power transmitting element which connects the drive mechanism to the spoiler and which transmits the imparted motion and power to the spoiler, thereby causing the spoiler to be actuated and controlled. One of the unique and fundamental features of the inventive device is that certain constituent members of the drive mechanism maintain a novel parallelogrammic positional relationship. The inventive device, unlike the prior art, not only permits control of the spoiler irrespective of the sweep position of the wing, but also permits the maintenance of the selected position of the spoiler irrespective of any subsequent change in the sweep of the wing.

8 Claims, 5 Drawing Figures

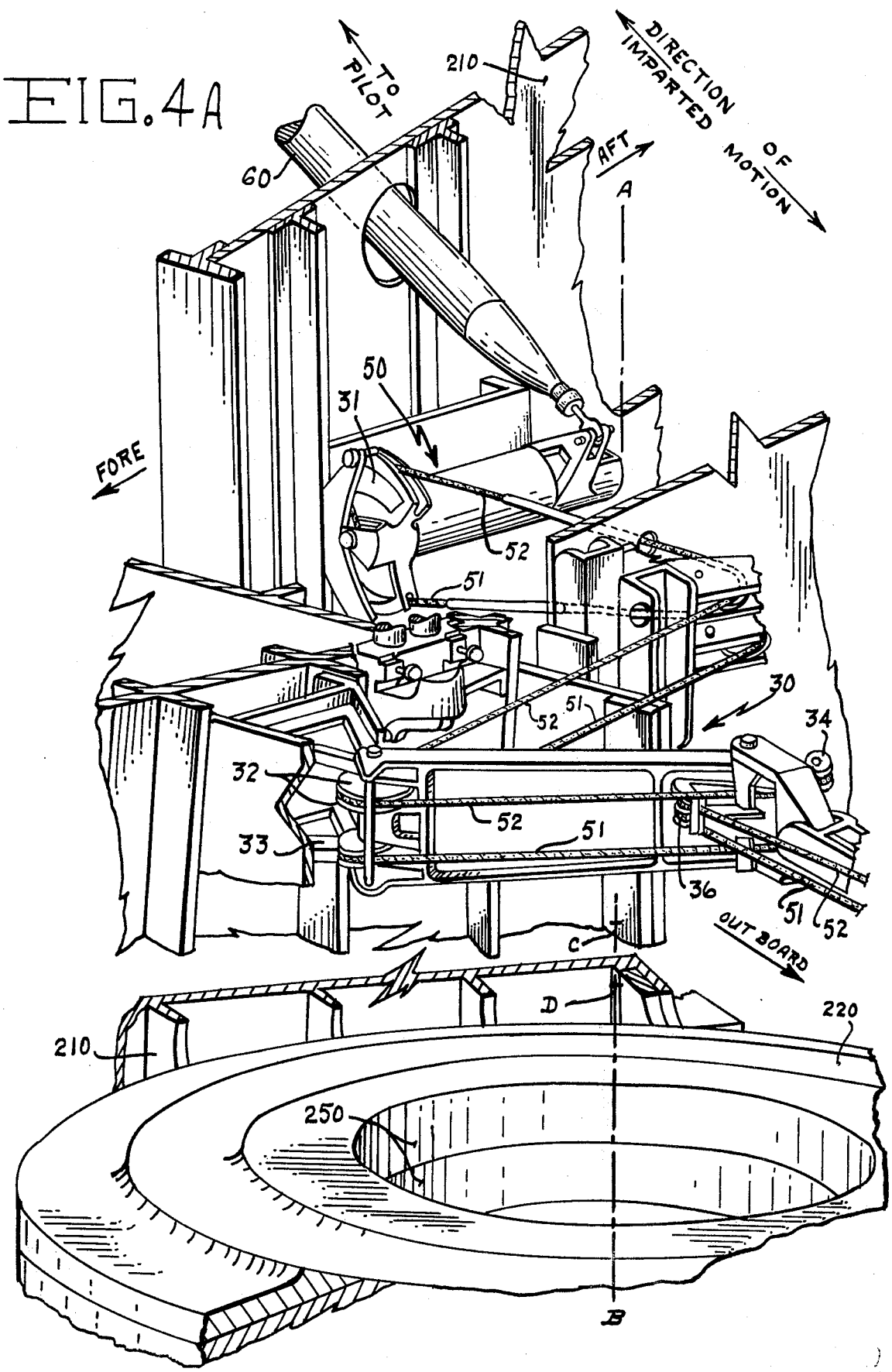

FLIGHT CONTROL DEVICE

STATEMENT OF GOVERNMENT INTEREST

The invention described herein may be manufactured and used by or for the Government for governmental purposes without the payment of any royalty thereon.

BACKGROUND OF THE INVENTION

This invention relates to a flight control device and, more particularly, to a device or mechanism for actuating, and controlling, relatively movable control surfaces on the wings of an airborne vehicle.

As a preliminary matter, it is to be noted that the term "airborne vehicle" as used herein is intended to means, in essence, a vehicle, craft, structure or the like, which is capable of airborne flight. Such airborne vehicles may include, but are not limited to, airplanes, gliders, and drones; and, such vehicles may also include missiles, spacecraft, and the like, when they are within the atmosphere.

It is also to be noted that, in the interest of simplicity, our inventive mechanism will be shown and described in a particular preferred embodiment adapted specifically for use with an airborne vehicle which has wings, and which said winged airborne vehicle is of the variable sweep wing type, i.e., where the wings are pivoted, hinged, or the like, to the airborne vehicle's body (e.g., the fuselage in the case of an aircraft) to enable the wings to be "swept back" or "folded back," as higher speeds are reached, and to be swept forwardly from the rearmost or "wings in" position, when desired. This adaptation is solely by way of illustration, and not by way of any limitation.

Movable, or relatively movable, control surfaces on the wings of an airborne vehicle are well known in the art, and include, but are not limited to, flaps, ailerons, and spoilers. As a matter of preference, our inventive mechanism will be shown and described as adapted for use with spoilers on the variable sweep back wings of a winged airborne vehicle. Spoilers are a special form of a movable, or of a relatively movable, control surface and perform the aerodynamic function of the aileron (i.e., roll control). Spoilers are located on the upper surface of the trailing edge of the (or of each) wing; and, they deflect only upwardly therefrom, as contrasted to ailerons which are deflectable either upwardly or downwardly, as described or needed. In addition, spoilers can be used to limit the speed of a winged airborne vehicle in a dive, or to decelerate the vehicle during landing.

As can be readily surmised, even by those not in the art, the structure of the control mechanism for the spoilers must be such that the variable sweep motion of the wings is neutralized and/or is eliminated; and, therefore, said variable sweep motion does not have any effect on the spoilers' position or of the actuation and/or of the control thereof. Stated another way, the structure of the control mechanism must take into account the movement, or possible or probable movement, of the variable sweep motion wings.

We have invented such a mechanism and have, thereby, significantly advanced the sate-of-the-art. In addition, the structure of our unique mechanism materially lengthens the normally expected "useful life" of some of the components thereof, such as cables and bearings.

SUMMARY OF THE INVENTION

This invention pertains to a flight control mechanism adapted specifically for actuating and/or controlling spoilers on the wings of an airborne vehicle having variable sweep (i.e., "folding") wings.

The principal object of this invention is to teach a mechanism which will permit the actuation and/or control of spoilers on variable sweep wings, and which will allow the spoilers to remain in the mode to which actuated, irrespective of the sweep or movement of the wings, whether rearwardly toward the "wings in" position or forwardly therefrom to the "normal" position.

Another object of this invention is to provide a spoiler control mechanism which will add to the normal "life expectancy" of some of the components of the control mechanism.

These objects, and other equally important and related objects, of our invention will become readily apparent after a consideration of the description of the invention, coupled with reference to the drawings.

DESCRIPTION OF THE PREFERRED EMBODIMENT

Figure 1:
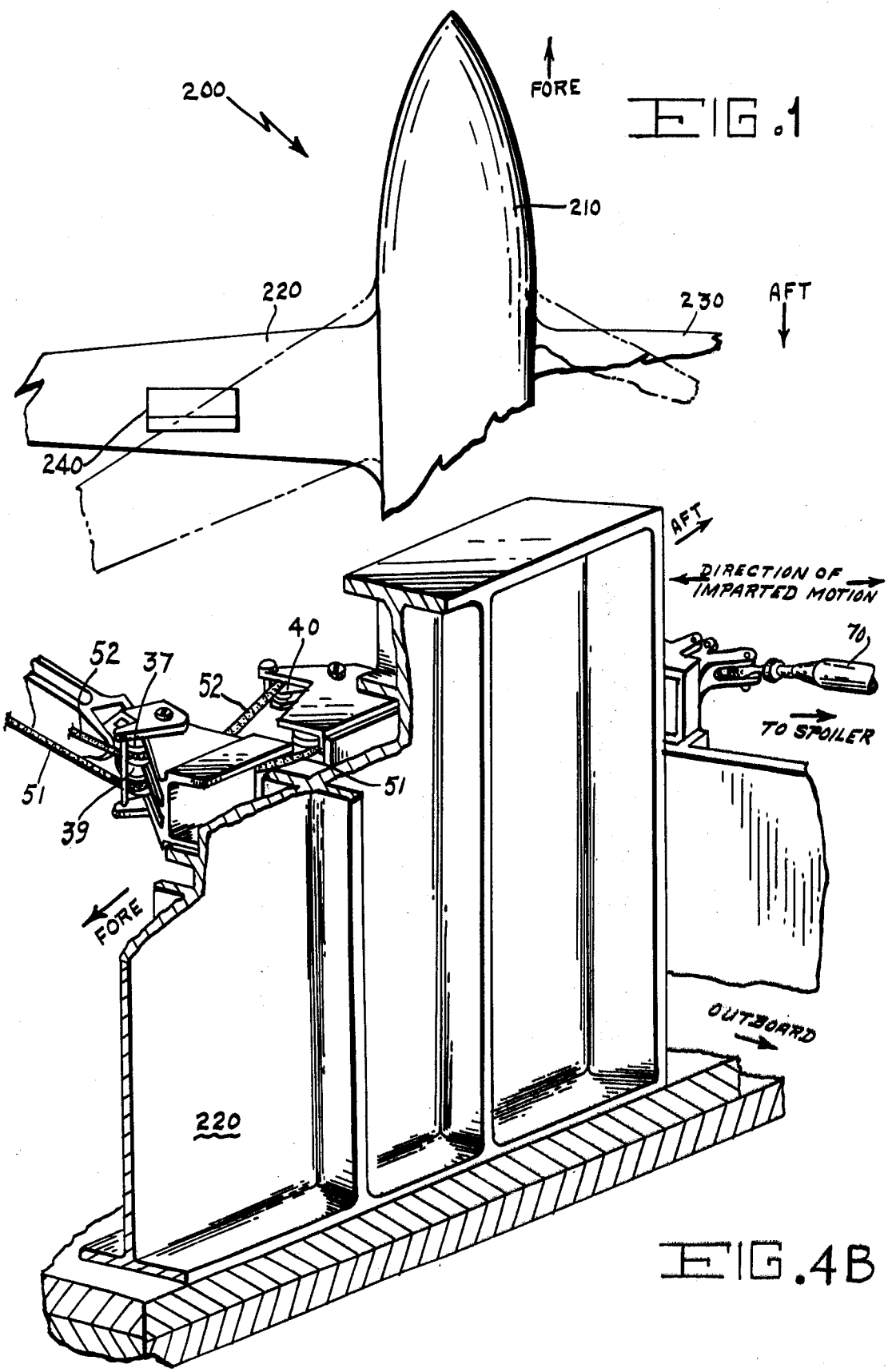
FIG. 1 is a top plan view, in simplified form and partially fragmented of an airborne vehicle variable sweep (i.e., "folding") wings, with the wings shown in phantom in a "swept in" (i.e., aft) position.

With reference to FIG. 1, therein is shown an airborne vehicle, generally designated 200, having a body (i.e., fuselage) 210, and at least one wing 220 (although it may have more than one wing, such as second wing 230). In the interest of maintaining simplicity of FIG. 1, body 210 and wings 220 and 230 are shown in partially fragmented form. Wings 220 and 230 are of the variable sweep (i.e., "folding") type, and are shown in FIG. 1 in the extreme fore position (i.e., "unswept" or "normal") and are also shown in phantom in the extreme aft position (i.e., "swept in"). Of course, the wings may be moved or "swept" to any position therebetween. Representative spoiler 240 is shown as being located on the upper surface of the trailing edge of wing 220; is in the open (i.e., upward) position; and, has been opened with and by the use of our inventive flight control device (not shown in FIG. 1) which will be described in detail and discussed later herein.

Figure 2:
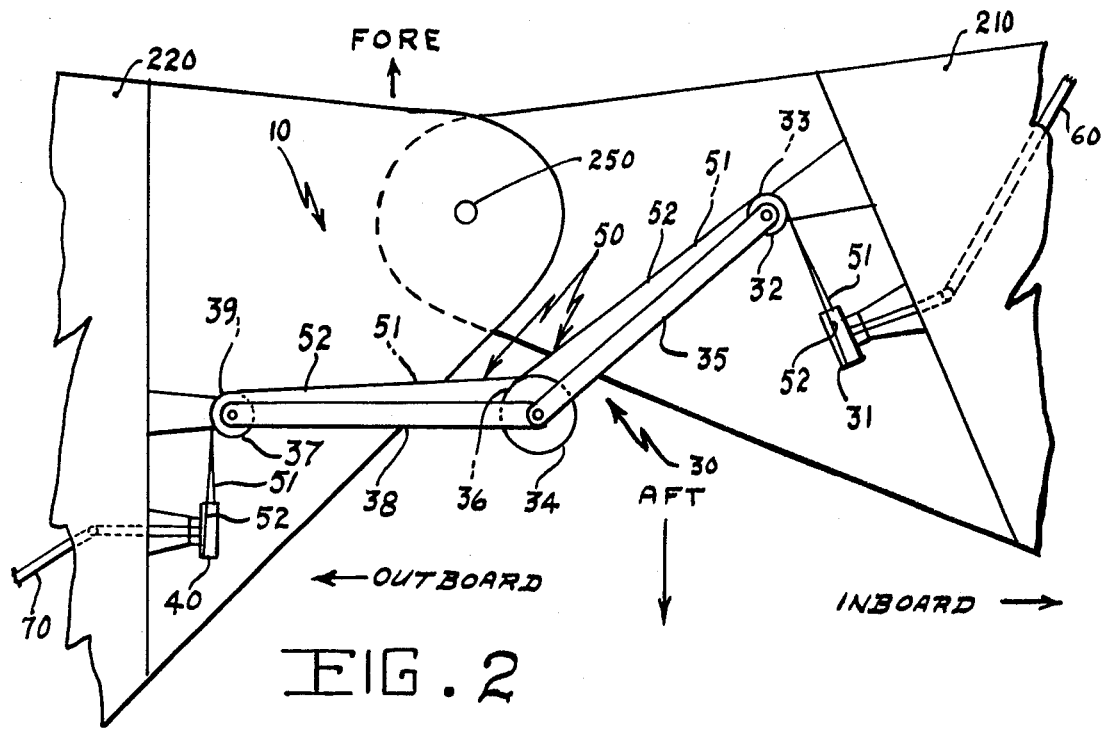
FIG. 2 is a top plan view, in simplified form and partially fragmented, of the fuselage of the airborne vehicle shown in FIG. 1 and of the left wing thereof in a wing-forward (i.e., "unswept") position, with the visible components of our inventive flight control device shown in their then positional relationship.

In FIG. 2, which is a top plan view of fuselage 210 to which is pivotally attached representative left variable wing 220 by suitable pivotal means, including pivot 250 (hereinafter referred to as the "wing pivot") the fuselage 210 and wing 220 are shown fragmented as a matter of convenience, the wing 220 is shown in the unswept or fully forward position, and a preferred embodiment of our inventive device which is generally designated by reference numeral 10 is shown in a top plan view.

The preferred embodiment 10 includes: a first motion and power transmitting means which includes a motion and power transmitting element 60 (hereinafter referred to as the "first transmitting element"); a drive mechanism, generally designated 30, to which the first transmitting element 60 is connected; means for flexibly connecting and driving constituent members of drive mechanism 30; and, a second motion and power transmitting means which includes a motion and power transmitting element 70 (hereinafter referred to as the "second transmitting element") that connects the drive mechanism 30 to the spoiler 240, FIG. 1.

Still with reference to FIG. 2, the drive mechanism 30, includes: a first rotatable member 31 mounted on the body (i.e., the fuselage) 210 of winged airborne vehicle 200, FIG. 1; a second rotatable member 32, also mounted on the fuselage 210 of airborne vehicle 200, with that member 32 having a preselected pitch diameter; a third rotatable member 33 which is identical to second rotatable member 32, which is also mounted on fuselage 210, which is disposed below of and in parallel spaced relationship with and to second rotatable member 32, and which is rotatable independently of second rotatable member 32; a fourth rotatable member 34 linked by suitable means, such as link 35, to second rotatable member 32 and which has a pitch diameter that is twice the preselected pitch diameter of second rotatable member 32; a fifth rotatable member 36, which is identical to fourth rotatable member 34, which is linked by suitable means to the third rotatable member 33, which is disposed below of and in parallel spaced relationship with and to fourth rotatable member 34, and which is rotatable independently of fourth rotatable member 34; a sixth rotatable member 37 linked by suitable means, such as link 38, to fourth rotatable member 34, which is mounted on the wing 220, and which has a pitch diameter which is equal to the pitch diameter of the second rotatable member 32; a seventh rotatable member 39 which is identical to the sixth rotatable member 37, which also is mounted on the wing 220, which is disposed below of and in parallel spaced relationship with and to the sixth rotatable member 37, and which is rotatable independently of the sixth rotatable member 37; and, an eighth rotatable member 40 which is mounted on the wing 220.

As a matter of preference, and not by way of any limitations, rotatable members 31, 32, 33, 34, 36, 37, 39 and 40 are pulleys. Additionally, rotatable members 32, 33, 34, 36, 37 and 38 are disposed horizontally, in contradistinction to the physically orientation of rotatable members 31 and 40 which will be discussed later herein. Further, rotatable member 33 preferably is in vertical alignment with rotatable member 32, rotatable member 36 preferably is in vertical alignment with rotatable member 34, and rotatable member 39 preferably is in vertical alignment with rotatable member 37.

It is here to be noted; that rotatable members 34 and 36 are "floating" when compared to fixedly positioned rotatable members 32, 33, 37 and 39; that wing pivot 250 is fixedly positioned; that rotatable members 32, 34 and 37 and wing pivot 250 are arranged in a first parallelogrammic arrangement, with these rotatable members 32, 34 and 37 and the wing pivot 250 acting as vertices of this first parallelogram; and, that rotatable members 33, 36 and 39 and wing pivot 250 are arranged in a second parallelogrammic arrangement, with these rotatable members 33, 36 and 39 and wing pivot 250 acting as vertices of this second parallelogram.

There is a first means for flexibly connecting, and for driving, rotatable members 31, 32, 34, 37 and 40; and, there is a second means for flexibly connecting, and for driving, rotatable members 31, 33, 36, 39 and 40. Said first and second means include, as a matter of preference and not of limitation, a cable 50 which is common to both means, which joins these first and second means, and which also is disposed essentially vertically (i.e., not in the plane defined by the drawing sheet) in the geometric form of a loop having an upper section 51 and a lower section 52, such as are shown at and near rotatable members 31 and 40 (which said members are, but need not be, also essentially vertically oriented), with cable sections 51 and 52 in a spaced apart relationship and at different (vertical) elevations.

Figure 3:
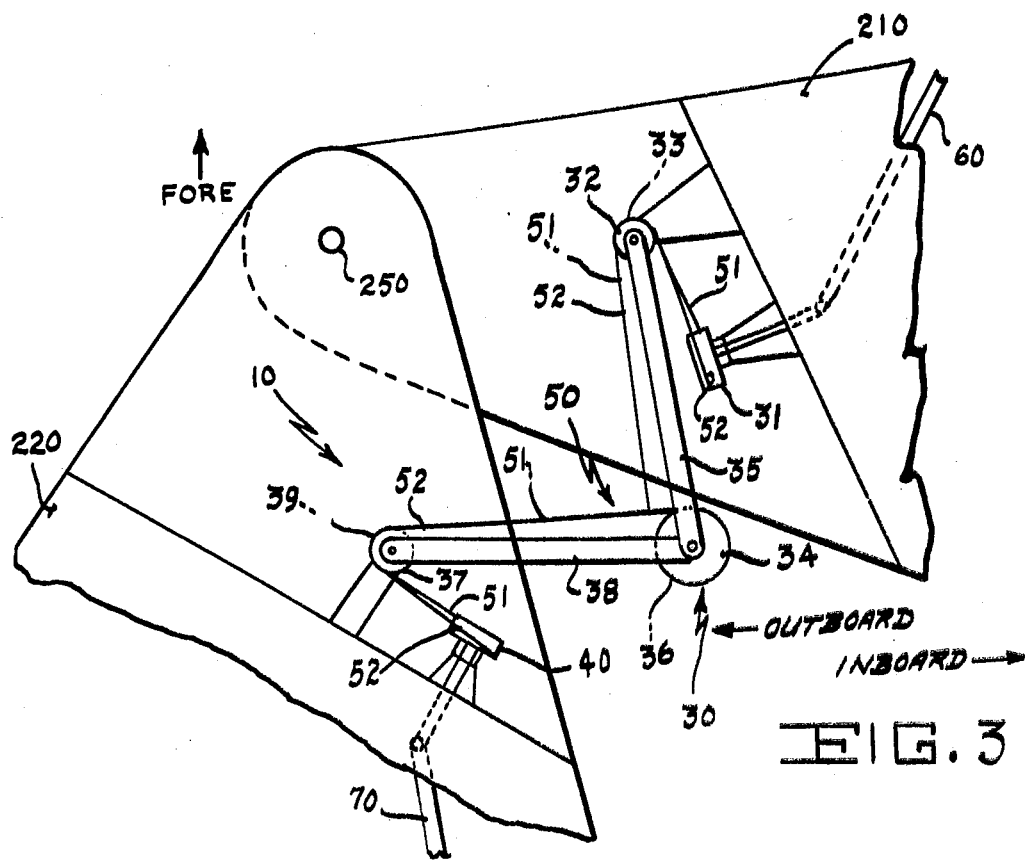
FIG. 3 is a top plan view, in simplified form and partially fragmented, of the fuselage of the airborne vehicle shown in FIG. 1 and of the left wing thereof in a wing-aft (i.e., "swept in") position; and, FIG. 4A and 4B constitute collectively a side elevation view, in perspective and in pictorial form, of our inventive flight control device in modified form as it, and the constituent components thereof, are positioned on and between the fuselage and the left wing of the airborne vehicle shown in FIG. 1.

With reference to FIG. 3, therein is shown, in a top plan view similar to that shown in FIG. 2, and in simplified form and partially fragmented, the fuselage (i.e., the body) 210 of the airborne vehicle 200, FIGS. 1 and 2, and the left variable sweep wing 220 thereof, FIGS. 1 and 2, and the preferred embodiment 10 of our inventive flight control device, previously shown in another condition or mode in FIG. 2. In this FIG. 3, the left wing 220 is in the wing-aft (i.e., "swept in") position, obviously having been moved fully aft (i.e., toward the fuselage or inboard), while the fuselage 210 has been kept or maintained in a head-on, straight forward direction.

An examination and a comparison of FIGS. 2 and 3 will readily disclose that the first parallelogrammic arrangement (i.e., with rotatable members 32, 34 and 37 and wing pivot 250 as vertices of this first parallelogram) has been maintained, as also has been the second parallelogrammic arrangement (i.e., with rotatable members 33, 36 and 39 and wing pivot 250 as vertices of this second parallelogram). What may not be readily apparent, but is easily ascertainable by any person of ordinary skill in the art, is that the selected position (i.e., open or closed) of the spoiler 240, FIG. 1, is and has been maintained the same (e.g., if open as in FIG. 1, it has remained open) in the, and despite the, physical transition and movement of the wing 220 from the fully forward wing position shown in FIG. 2 to the fully aft wing position shown in FIG. 3.

With reference to FIGS. 4A and 4B, said Figures complement each other and collectively constitute a side elevation view, in pictorial form and in perspective, of our inventive flight control device 10, as it is integrated into the fuselage 210 and the left variable sweep wing 220 of airborne vehicle 200.

As to FIG. 4A, therein are shown, among other things, that portion of our inventive control device 10 which is mounted on the body (i.e., fuselage) 210 of winged airborne vehicle 200. More specifically, one can easily see that rotatable members 31, 32 and 33 are mounted on the fuselage 210. One can also easily see: that the first transmitting element 60 can be actuated by the pilot (or other user) to move either outwardly (i.e., outboard) or inwardly (i.e., inboard); that first rotatable member 31 of our drive mechanism 30 is connected to first transmitting element 60, and is vertically disposed; that cable 50 is disposed essentially vertically in the geometric form of a loop having an upper section 52 and a lower section 51, with these cable sections 51 and 52 in spaced apart relationship and at different vertical elevations (i.e., section 52 is above or at "higher" elevation than section 51); that rotatable members 34 and 36 are "floating" (i.e., not mounted on either the fuselage 210 or the wing 220, or on anything else); that rotatable member 33 is disposed below of, in parallel spaced relationship with, and in vertical alignment with rotatable member 32; that, likewise, rotatable member 36 is disposed below of, in parallel spaced relationship with, and in vertical alignment with rotatable member 34; that rotatable member 33 is independently rotatable of rotatable member 32; that rotatable member 36 is independently rotatable of rotatable member 34; that rotatable members 32, 33, 34 and 36 are disposed in a horizontal position; and, that rotatable member 21 is disposed in a vertical position.

As to FIG. 4B, therein are shown, among other things, that portion of our inventive control device 10 which is mounted on the wing 220 of the airborne vehicle 200. One can easily see that rotatable members 37, 39 and 40 are mounted on the wing 220. One can also easily see: that second transmitting element 70 is responsive to the power and motor imparted to the first transmitting element 60. FIG. 4A; that element 70 leads to (and, in fact, is connected to) the spoiler 240, FIG. 1, and thereby connects rotatable element 40 to the spoiler 240; that rotatable member 39 is disposed below of, in parallel spaced relationship with, and in vertical alignment with rotatable member 37; that rotatable member 39 is independently rotatable of rotatable member 37; and, that rotatable member 37 and 39 are disposed in a horizontal position.

As to FIGS. 4A and 4B when viewed collectively, and imagined joined where they are fragmented, one can easily see: that a point C on geometric vertical center axis A–B of pivot 250, and rotatable members 32, 34 and 37, are arranged in a parallelogrammic arrangement, with said point C and said rotatable members limiting and defining a parallelogram of which said point and said rotatable members are the vertices; that another point D on geometric vertical center axis A–B of pivot 250, and rotatable members 33, 36 and 39, are arranged in another parallelogrammic arrangement, with said point D and said rotatable members limiting and defining another parallelogram of which said point and said rotatable members are the vertices; that cable 50, by and through cable loop upper section 52, acts as a flexible connecting and driving means of and for rotatable members 31, 32, 34, 37 and 40; and, that cable 50, by and through cable loop lower section 51, acts as another flexible connecting and driving means of and for rotatable members 31, 33, 36, 39 and 40.

MANNER OF OPERATION OF THE PREFERRED EMBODIMENT

The effect of the structure of, and the manner of operation of, our unique flight control device, as adapted for actuating and controlling a spoiler on a variable sweep wing of an airborne vehicle is self-evident to, and is very easily understandable by, an ordinary person skilled in the art from the herein contained description of the preferred embodiment 10, coupled with reference to the Figures of the drawing.

For others, suffice it to say, in essence: that the "control signal" (i.e., the imparted motion) is a rotation of rotatable member 31 which is transmitted to, and is converted to, a rotation of rotatable member 40; that, when in motion due to the transmission of the control signal, the cable loop sections 51 and 52 move in opposite directions to transmit the motion or "signal"; and, that the essential and fundamental features of the drive mehcanism which allow sweep motion of the wing without inducing a control rotation at and of rotatable member 40 (and, thereby, motion to the spoiler, 240) are: the two parallelogrammic arrangements described hereinabove; and, the fact that rotatable "floating" members 34 and 36 are twice the pitch diameter of rotatable members 32, 33, 37 and 39.

Stated in another way, and assuming that the angle through which the wing has swept is equal to length L of cable 50, then: the cable 50 (and loop sections 51 and 52) have "wrapped up" L length at and on rotatable members 32, 33, 37 and 39 (i.e., essentially two places); the cable 50 (and loop sections 51 and 52) has "unwrapped" L length at and from rotatable members 34 and 36 (i.e., essentially one place, but twice the pitch diameter); and, therefore, the total length L "wrapped up" at two places equals the total length L "unwrapped" at one place, with the result that the loop of cable 50 has been "folded" without the cable 50 (and the cable loop comrising sections 51 and 52) being stretched or going slack.

As a result, control may be transmitted from element 60 to and through drive mechanism 30 to and through element 70 to the spoiler 240, thereby actuating and controlling the spoiler 240, irrespective of the then sweep position of the wing 220, and the selected position of the spoiler 240 will be maintained irrespective of any subsequent change in the sweep of the wing 220.

CONCLUSION

It is abundantly clear from all of the foregoing, and from the Figures of the drawing, herein, that the stated and desired principal object of our invention has been attained. In addition, related desirable objects also have been achieved.

It is to be noted that, although there have been described the fundamental and unique features of our invention as applied to a particular preferred embodiment, various other embodiments, substitutions, additions, omissions, adaptations, and the like will occur to, and can be made by, those of ordinary skill in the art, without departing from the spirit of our invention.

What is claimed is:

1. A flight control device for an airborne vehicle having a body and at least one wing, wherein each wing of said winged airborne vehicle is of the variable sweep type, is attached by suitable pivotal means, including a pivot, to said airborne vehicle body, and has a spoiler suitably positioned thereon, and wherein said flight control device is adapted for use in actuating and controlling said spoiler, comprising:

a. a first motion and power transmitting means which includes a first motion and power transmitting element;

b. a drive mechanism to which said first motion and power transmitting element is connected, wherein said drive mechanism includes:

1. a first rotatable member mounted on the body of the winged airborne vehicle;

2. a second rotatable member also mounted on the body of the winged airborne vehicle, with said second rotatable member having a preselected pitch diameter;

3. a third rotatable member, identical to said second rotatable member and also mounted on the body of the winged airborne vehicle, with said third rotatable member disposed below of and in parallel spaced relationship with said second rotatable member, and with said third rotatable member rotatable independently of said second rotatable member;

4. a fourth rotatable member linked by suitable means to said second rotatable member, with said fourth rotatable member having a pitch diameter which is twice the preselected pitch diameter of said second rotatable member;

5. a fifth rotatable member, identical to said fourth rotatable member, with said fifth rotatable member linked by suitable means to said third rotatable member, and with said fifth rotatable member disposed below of and in parallel spaced relationship with said fourth rotatable member, and further with said fifth rotatable member rotatable independently of said fourth rotatable member;

6. a sixth rotatable member linked by suitable means to said fourth rotatable member and mounted on the wing of the winged airborne vehicle, with said sixth rotatable member having a pitch diameter which is equal to the pitch diameter of said second rotatable member;

7. a seventh rotatable member, identical to said sixth rotatable member, and also mounted on the wing of the winged airborne vehicle, with said seventh rotatable member disposed below of and in parallel spaced relationship with said sixth rotatable member, and further with said seventh rotatable member rotatable independently of said sixth rotatable member;

8. an eighth rotatable member mounted on the wing of the winged airborne vehicle;

with said second, fourth, and sixth rotatable members and said pivot of said body-wing pivotal means arranged in a first parallelogrammic arrangement, and with said second, fourth, and sixth rotatable members and said pivot of said body-wing pivotal means acting as vertices of said first parallelogram;

and with said third, fifth, and seventh rotatable members and said pivot of said body-wing pivotal means arranged in a second parallelogrammic arrangement, with said third, fifth, and seventh rotatable members and said pivot of said body-wing pivotal means acting as vertices of said second parallelogram;

c. a first means for flexibly connecting and for driving said first, second, fourth, sixth, and eighth rotatable members;

d. a sound means for flexibly connecting and driving said first, third, fifth seventh, and eighth rotatable members;

e. and, a second motion and power transmitting means which includes a second motion and power transmitting element connecting said eighth rotatable member to the spoiler which is positioned on the wing of said winged airborne vehicle;

whereby when motion and power are imparted to said first motion and power transmitting element, the imparted motion and power are transmitted by said first element to said drive mechanism and then to said second motion and power transmitting element, and by said second element to the spoiler, thereby causing the spoiler to be actuated and controlled.

2. A flight control device, as set forth in claim 1, wherein said second, third, fourth, fifth, sixth, and seventh rotatable members of said drive mechanism are pulleys disposed in a horizontal position.

3. A flight control device, as set forth in claim 1, wherein said first rotatable member of said drive mechanism is a pulley disposed in a vertical position.

4. A flight control device, as set forth in claim 1, wherein said eighth rotatable member of said drive mechanism is a pulley disposed in a vertical position.

5. A flight control device, as set forth in claim 1, wherein said third rotatable member of said drive mechanism is also disposed in vertical alignment with said second rotatable member.

6. A flight control device, as set forth in claim 1, wherein said fifth rotatable member of said drive mechanism is also disposed in vertical alignment with said fourth rotatable member.

7. A flight control device, as set forth in claim 1, wherein said seventh rotatable member of said drive mechanism is also disposed in vertical alignment with said sixth rotatable member.

8. A flight control device, as set forth in claim, 1 wherein said first flexible connecting and driving means and said second flexible connecting and driving means include a cable common to both said means, with said common cable joining said first and said second flexible connecting and driving means, and also with said common cable disposed essentially vertically in the geometric form of a loop having an upper section and a lower section, which said cable sections are in spaced apart relationship and are at different vertical elevations.

* * * * *